(12) United States Patent
Zheng

(10) Patent No.: US 12,093,086 B2
(45) Date of Patent: Sep. 17, 2024

(54) DISPLAY DEVICE

(71) Applicant: WUHAN CHINA STAR OPTOELECTRONICS SEMICONDUCTOR DISPLAY TECHNOLOGY CO., LTD., Wuhan (CN)

(72) Inventor: Bingwen Zheng, Wuhan (CN)

(*) Notice: Subject to any disclaimer, the term of this patent is extended or adjusted under 35 U.S.C. 154(b) by 0 days.

(21) Appl. No.: 17/635,700

(22) PCT Filed: Jan. 7, 2022

(86) PCT No.: PCT/CN2022/070773
§ 371 (c)(1),
(2) Date: Feb. 16, 2022

(87) PCT Pub. No.: WO2023/123539
PCT Pub. Date: Jul. 6, 2023

(65) Prior Publication Data
US 2024/0036617 A1 Feb. 1, 2024

(30) Foreign Application Priority Data
Dec. 28, 2021 (CN) .......................... 202111624927.9

(51) Int. Cl.
G06F 1/16 (2006.01)

(52) U.S. Cl.
CPC .......... *G06F 1/1681* (2013.01); *G06F 1/1616* (2013.01); *G06F 1/1656* (2013.01)

(58) Field of Classification Search
CPC ........ G06F 1/1616; G06F 1/1656; G06F 1/16; G06F 1/1681
See application file for complete search history.

(56) References Cited

U.S. PATENT DOCUMENTS

| 8,804,349 B2 * | 8/2014 | Lee ........................ G06F 1/1641 361/679.01 |
| 8,908,365 B2 * | 12/2014 | Walters ............... H04M 1/0247 312/319.2 |
| 10,367,173 B1 * | 7/2019 | Wu ........................ H10K 59/873 |
| 11,805,604 B2 * | 10/2023 | Lee ........................ H05K 5/0217 |
| 2011/0056779 A1 * | 3/2011 | McGee ................... F16D 69/04 428/141 |
| 2014/0029171 A1 * | 1/2014 | Lee ........................ H04M 1/0268 361/679.01 |

(Continued)

FOREIGN PATENT DOCUMENTS

| CN | 107564423 A | 1/2018 |
| CN | 207601679 U | 7/2018 |

(Continued)

*Primary Examiner* — Rockshana D Chowdhury
*Assistant Examiner* — Martin Antonio Asmat Uceda

(57) ABSTRACT

The present application provides a display device. The display device includes a first body and a second body rotatably connected to a side of the rotating shaft respectively, a first slider connected to the first body, and a second slider connected to the second body. The first slider includes a first slide body, and a first elastic body for applying an elastic force to the first slide body in a direction away from the rotating shaft. The second slider includes a second slide body, and a second elastic body for applying an elastic force to the second slide body in a direction away from the rotating shaft.

20 Claims, 4 Drawing Sheets

(56) References Cited

U.S. PATENT DOCUMENTS

| | | | |
|---|---|---|---|
| 2017/0169741 A1 | 6/2017 | Lim | |
| 2017/0322595 A1* | 11/2017 | Lee | H05K 5/00 |
| 2021/0011514 A1* | 1/2021 | Wang | G06F 1/1681 |
| 2021/0227709 A1 | 7/2021 | Sim et al. | |

FOREIGN PATENT DOCUMENTS

| | | |
|---|---|---|
| CN | 209199497 U | 8/2019 |
| CN | 110379313 A | 10/2019 |
| CN | 111182102 A | 5/2020 |
| CN | 111343310 A | 6/2020 |
| CN | 111627329 A | 9/2020 |
| CN | 112216212 A | 1/2021 |
| CN | 113066377 A | 7/2021 |
| WO | WO-2021253942 A1 * | 12/2021 |

\* cited by examiner

DISPLAY DEVICE

TECHNICAL FIELD

The present application relates to a field of display technology, and in particular to a display device.

BACKGROUND

With the development of display technology, folding displays have gradually emerged in the display market. In recent years, major display terminal manufacturers began to bring out or plan to bring out folding display terminals, thereby increasing market share of folding display devices. In existing folding display devices on the market, a crease occurs in the folding area due to folding, and the crease becomes more and more serious with the increase of the use time, which seriously affects user's perception experience.

Technical Problems

The folding display device in the existing art has a technical problem that the crease of the display panel in the folding area is obvious.

SUMMARY

The present application provides a display device for alleviating the obvious technical problem that the crease of the display panel in the folding area is obvious.

The present application provides a display device, comprising:
- a rotating shaft;
- a first body and a second body disposed on opposite sides of the rotating shaft and rotatably connected to the rotating shaft;
- a first slider and a second slider, wherein the first slider is connected to the first body; the second slider is connected to the second body; the first slider comprises a first slide body, and a first elastic body for applying an elastic force to the first slide body in a direction away from the rotating shaft; the second slider comprises a second slide body, and a second elastic body for applying an elastic force to the second slide body in the direction away from the rotating shaft; and
- a display panel disposed on a bearing surface defined by the first body, the second body, the first slide body, and the second slide body; wherein the display panel is connected to the first body and the second body by a first adhesive member, and the display panel is connected to the first slide body and the second slide body by a second adhesive member;
- an elastic modulus of the second adhesive member is greater than an elastic modulus of the first adhesive member.

In the display device of the present application, an elastic force applied by the first elastic body to the first slide body is greater than a shear resistance force of the first adhesive member and less than a shear resistance force of the second adhesive member, and an elastic force applied by the second elastic body to the second slide body is greater than the shear resistance force of the first adhesive member and less than the shear resistance force of the second adhesive member.

In the display device of the present application, a plane of the first slide body supporting the display panel is coplanar with a plane of the first body supporting the display panel, and a plane of the second slide body supporting the display panel is coplanar with a plane of the second body supporting the display panel.

In the display device of the present application, the first slider comprises a first carrier, the first elastic body and the first slide body are disposed in the first carrier, and the first slide body is movable in the first carrier in a direction away from or close to the rotating shaft.

In the display device of the present application, the second slider comprises a second carrier, the second elastic body and the second slide body are disposed in the second carrier, and the second slide body is movable in the second carrier in a direction away from or close to the rotating shaft.

In the display device of the present application, the first carrier is movably connected to the first body, and the first carrier is movable in the direction away from or close to rotating shaft.

In the display device of the present application, the second carrier is movably connected to the second body, and the second carrier is movable in the direction away from or close to rotating shaft.

In the display device of the present application the first slider further comprises a first slide rail and a first guide rod fixedly disposed in the first carrier, the first slide body is slidably connected to the first slide rail, and the first elastic body applies an elastic force to the first slide body along the first guide rod.

In the display device of the present application, the second slider further comprises a second slide rail and a second guide rod fixedly disposed in the second carrier, the second slide body is slidably connected to the second slide rail, and the second elastic body applies an elastic force to the second slide body along the second guide rod.

In the display device of the present application, a first guide hole fitted with the first guide rod is defined on the first slide body, the first guide rod is perforated through the first guide hole, and the first elastic body is sleeved on the first guide rod.

In the display device of the present application, a second guide hole fitted the second guide rod is defined on the second slide body, the second guide rod is perforated through the second guide hole, and the second elastic body is sleeved on the second guide rod.

In the display device of the present application, the first carrier has a groove structure, and a groove-shaped opening of the first carrier faces the display panel; the first slide body has a convex structure, and a convex end of the first slide body faces a groove-shaped bottom of the first carrier.

In the display device of the present application, the second carrier has a groove structure, and a groove-shaped opening of the second carrier faces the display panel; the second slide body has a convex structure, and a convex end of the second slide body faces a groove-shaped bottom of the second carrier.

In the display device of the present application, the first slide body comprises a first carrier platform close to the display panel and a first support platform close to the groove-shaped bottom of the first carrier;
a surface width of the first carrier platform on a side close to the display panel is greater than a surface width of the first support platform on a side close to the groove-shaped bottom of the first carrier.

In the display device of the present application, the first elastic body is disposed on a side of the first support platform facing the rotating shaft.

In the display device of the present application, the second slide body comprises a second carrier platform close to the display panel and a second support platform close to the groove-shaped bottom of the second carrier;
a surface width of the second carrier platform on a side close to the display panel is greater than a surface width of the second support platform on a side close to the groove-shaped bottom of the second carrier.

In the display device of the present application, the second elastic body is disposed on a side of the second support platform facing the rotating shaft.

In the display device of the present application, a number of the first slide rails is two, and the first slide rails are disposed at opposite ends of the first carrier; a number of the first guide rods is four, and the first guide rods are distributed equidistantly in the first carrier along a length direction of the first carrier;
a number of the second slide rails is two, and the second slide rails are disposed at opposite ends of the second carrier; a number of the second guide rods is four, and the second guide rods are distributed equidistantly in the second carrier along a length direction of the second carrier.

In the display device of the present application, the first adhesive member is disposed along edges of the first body and the second body, and an extension direction of the first adhesive member is perpendicular to a length direction of the rotating shaft;
the second adhesive member is disposed along the first slide body and the second slide body, and an extension direction of the second adhesive member is parallel to the length direction of the rotating shaft.

The present application further provides a display device, comprising:
a rotating shaft;
a first body and a second body disposed on opposite sides of the rotating shaft and rotatably connected to the rotating shaft;
a first slider and a second slider, wherein the first slider is connected to the first body; the second slider is connected to the second body; the first slider comprises a first slide body, and a first elastic body for applying an elastic force to the first slide body in a direction away from the rotating shaft; the second slider comprises a second slide body, and a second elastic body for applying an elastic force to the second slide body in the direction away from the rotating shaft; and
a display panel disposed on a bearing surface defined by the first body, the second body, the first slide body, and the second slide body; wherein the display panel is connected to the first body and the second body by a first adhesive member, and the display panel is connected to the first slide body and the second slide body by a second adhesive member;
an elastic modulus of the second adhesive member is greater than an elastic modulus of the first adhesive member, an elastic force applied by the first elastic body to the first slide body is greater than a shear resistance force of the first adhesive member and less than a shear resistance force of the second adhesive member, and an elastic force applied by the second elastic body to the second slide body is greater than the shear resistance force of the first adhesive member and less than the shear resistance force of the second adhesive member;
the first adhesive member is disposed along edges of the first body and the second body, and an extension direction of the first adhesive member is perpendicular to a length direction of the rotating shaft; the second adhesive member is disposed along the first slide body and the second slide body, and an extension direction of the second adhesive member is parallel to the length direction of the rotating shaft.

Beneficial Effects

The present application provides a display device including a first body and a second body rotatably connected to a side of a rotating shaft respectively, a first slider connected to the first body, and a second slider connected to the second body. The first slider includes a first slide body, and a first elastic body for applying an elastic force to the first slide body in a direction away from the rotating shaft. The second slider includes a second slide body, and a second elastic body for applying an elastic force to the second slide body in a direction away from the rotating shaft. The display panel is connected to the first body and the second body by a first adhesive member, and connected to the first slide body and the second slide body by a second adhesive member. The elastic modulus of the second adhesive member is greater than the elastic modulus of the first adhesive member. In the present application, the first slider and the second slider are provided, the first slider and the second slider are connected to the display panel by the second adhesive member, the first body and the second body are connected to the display panel by the first adhesive member, the display panel is stretched toward both ends by the elastic force provided by the first slider and the second slider in a direction away from the rotating shaft, thereby relieving the creases in the bend area of the display panel, and improving the appearance characteristics and the display characteristics of the display device.

BRIEF DESCRIPTION OF THE DRAWINGS

In order to more clearly illustrate the embodiments or prior art solutions, the accompanying drawings required for use in the description of the embodiments or prior art will be briefly described below. It will be apparent that the accompanying drawings in the following description are merely some of the embodiments of the application, and other drawings may be obtained from these drawings without creative effort by one of ordinary skill in the art.

DETAILED DESCRIPTION OF THE EMBODIMENTS

Figure 1:
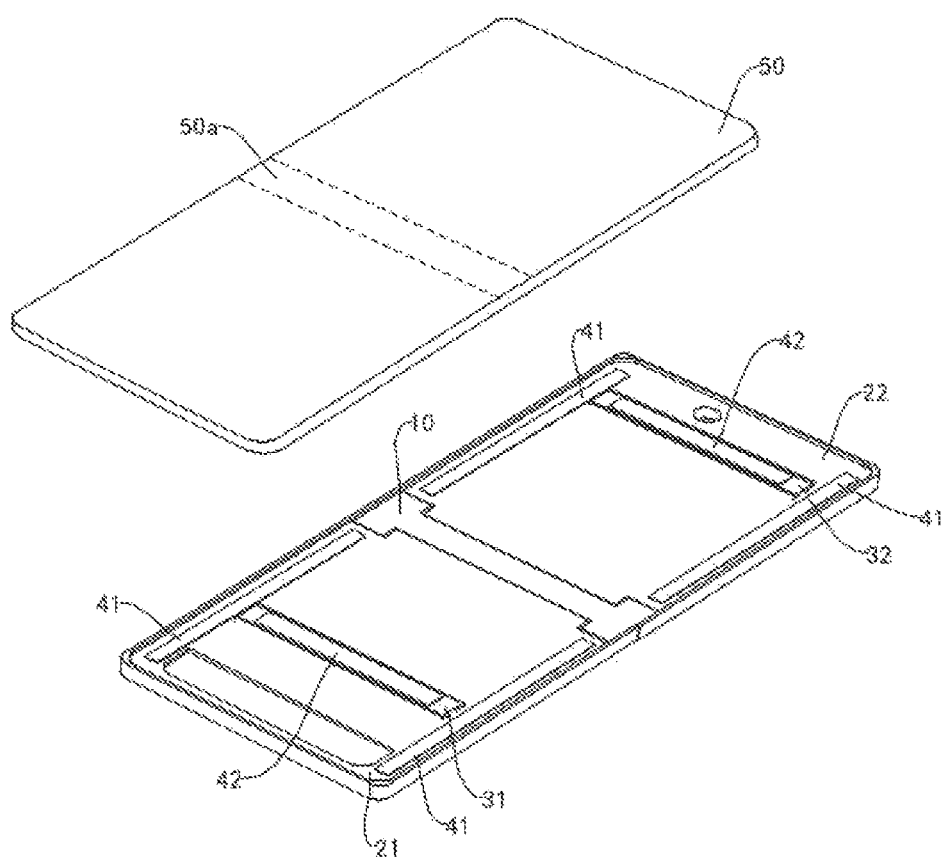
FIG. 1 is a partially exploded view of a display device according to an embodiment of the present application.

The following embodiments are described with reference to additional illustrations to illustrate specific embodiments that may be implemented by the present application. The direction terms mentioned in the present application, such as [upper], [lower], [front], [rear], [left], [right], [inner],

[outer], [side], and the like, refer only to the directions of the additional drawings. Therefore, the direction terms used are intended to illustrate and understand the present application and are not intended to limit the present application. In the figures, elements of similar structure are denoted by the same reference numerals.

An embodiment of the present application provides a display device including a first body and a second body rotatably connected to a side of a rotating shaft respectively, a first slider connected to the first body, and a second slider connected to the second body. The first slider includes a first slide body, and a first elastic body for applying an elastic force to the first slide body in a direction away from the rotating shaft. The second slider includes a second slide body, and a second elastic body for applying an elastic force to the second slide body in a direction away from the rotating shaft. The display panel is connected to the first body and the second body by a first adhesive member, and connected to the first slide body and the second slide body by a second adhesive member. The elastic modulus of the second adhesive member is greater than the elastic modulus of the first adhesive member. In the present application, the first slider and the second slider are provided, the first slider and the second slider are connected to the display panel by the second adhesive member, the first body and the second body are connected to the display panel by the first adhesive member, the display panel is stretched toward both ends by the elastic force provided by the first slider and the second slider in a direction away from the rotating shaft, thereby relieving creases in the bend area of the display panel, and improving the appearance characteristics and the display characteristics of the display device.

Relevant technical features of a display device provided by an embodiment of the present application are described below with reference to the accompanying drawings.

Referring to FIG. 1, FIG. 1 is a partially exploded view of a display device according to an embodiment of the present application. The display device includes a rotating shaft 10, a first body 21 and a second body 22 provided on opposite sides of the rotating shaft 10, a first slider 31 connected to the first body 21, a second slider 32 connected to the second body 22, and a display panel 50 disposed on a bearing surface defined by the first body 21, the second body 22, the first slider 31, and the second slider 32. Wherein the display panel 50 is bendable at least in a region corresponding to the rotating shaft 10 to form a bend area 50a. The first body 21 and the second body 22 are rotatable about the rotating shaft 10, and the rotatable direction of the first body 21 and the second body 22 is such that the first body 21 and the second body 22 turn over toward a side of the display panel 50 in the unfolded state of the same plane until the display panel 50 is fully folded. It is also possible to rotate in a direction opposite to the rotation direction described above, that is, from the folded state to the unfolded state.

Alternatively, the rotating shaft 10 may be a rotating hinge that may include a plurality of transmission mechanisms, synchronization mechanisms, or the like to achieve synchronous folding or synchronous unfolding of the first body 21 and the second body 22. Under the action of the rotating hinge, the display panel 50 forms a wedge-shaped structure, a water droplet-shaped structure, or the like in a fully folded state.

In the fully unfolded state, the side surfaces of the first body 21, the second body 22, and the rotating shaft 10 facing the display panel 50 are coplanar, thereby forming a flat support for the display panel 50 and providing an advantage for raising the surface flatness of the display panel 50.

The first body 21 is provided with a groove in an area corresponding to the first slider 31, and the first slider 31 is disposed in the groove of the first body 21 to ensure that a surface of the first body 21 facing the display panel 50 is coplanar with a surface of the first slider 31 facing the display panel 50. The second body 22 is also provided with a groove in an area corresponding to the second slider 32 and the second slider 32 is disposed in the groove of the second body 22 to ensure that a surface of the second body 22 facing the display panel 50 is coplanar with a surface of the second slider 32 facing the display panel 50.

The display panel 50 is connected to the first body 21 and the second body 22 by a first adhesive member 41, and connected to the first slider 31 and the second slider 32 by a second adhesive member 42, and the elastic modulus of the second adhesive member 42 is greater than the elastic modulus of the first adhesive member 41. A portion of the first slider 31 adhering to the display panel 50 can be moved in a direction away from or close to the rotating shaft 10, and a force is always applied to the display panel 50 in a direction away from the rotating shaft 10. A portion of the second slider 32 adhering to the display panel 50 may also be moved in a direction away from or close to the rotating shaft 10, and a force is applied to the display panel 50 in a direction away from the rotating shaft 10. The first slider 31 and the second slider 32 together apply a force to the display panel 50 away from the rotating shaft 10, and the elastic modulus of the second adhesive member 42 is greater than the elastic modulus of the first adhesive member 41, so that the display panel 50 always has a tendency to stretch toward both ends, thereby relieving or eliminating the creases formed by the display panel 50 in the bend area 50a thereof.

Further, the forces applied to the display panel 50 by the first slider 31 and the second slider 32 are both greater than a shear resistance force of the first adhesive 41 and less than a shear resistance force of the second adhesive 42. At the same time, based on the design that the elastic modulus of the second adhesive member 42 is greater than the elastic modulus of the first adhesive member 41, it is understood that the display panel 50 is stretched toward both ends by the force of the first slider 31 and the second slider 32, the first adhesive member 41 is deformed due to the movement of the display panel 50, and the second adhesive member 42 is not deformed or only deformed to a small extent due to the higher elastic modulus.

Alternatively, the first adhesive member 41 is disposed along the edges of the first body 21 and the second body 22, and an extension direction of the first adhesive member 41 is perpendicular to a length direction of the rotation shaft 10. The second adhesive member 42 is disposed along the first slider 31 and the second slider 32, and an extension direction of the second adhesive member 42 is parallel to a length direction of the rotating shaft 10.

Specifically, the number of the first adhesive members 41 may be four, wherein two of the first adhesive members 41 are disposed on opposite sides of the first body 21 in a direction perpendicular to the length direction of the rotating shaft 10, and the other two of the first adhesive members 41 are disposed on opposite sides of the second body 22 in a direction perpendicular to the length direction of the rotating shaft 10.

Figure 2:
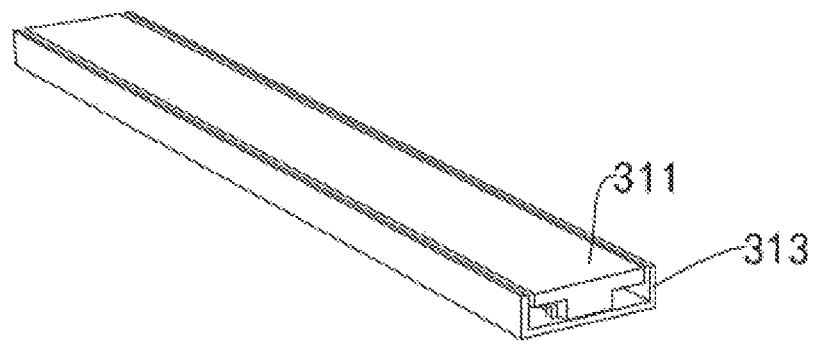
FIG. 2 is a first view of a first slider according to an embodiment of the present application.
Figure 3:
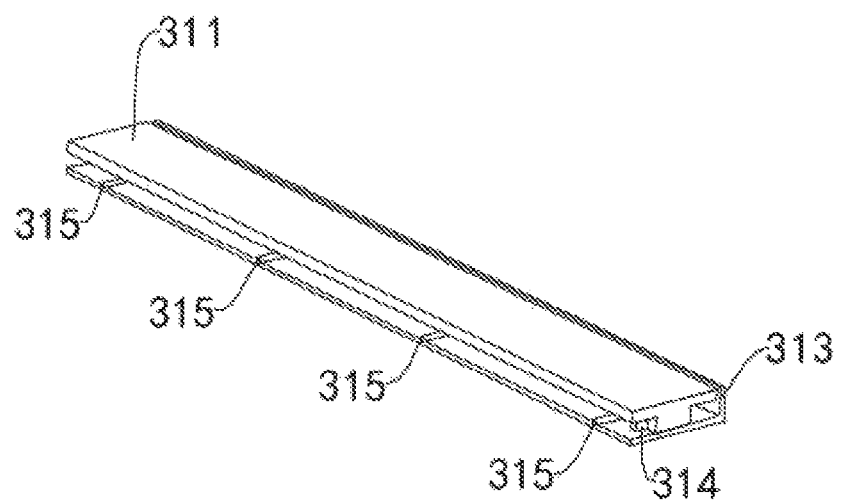
FIG. 3 is a first view of a partial structure of the first slider according to an embodiment of the present application.
Figure 4:
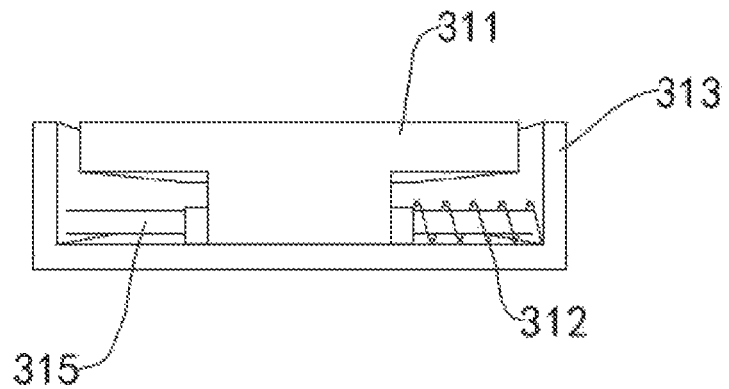
FIG. 4 is a second view of the first slider according to an embodiment of the present application.
Figure 5:
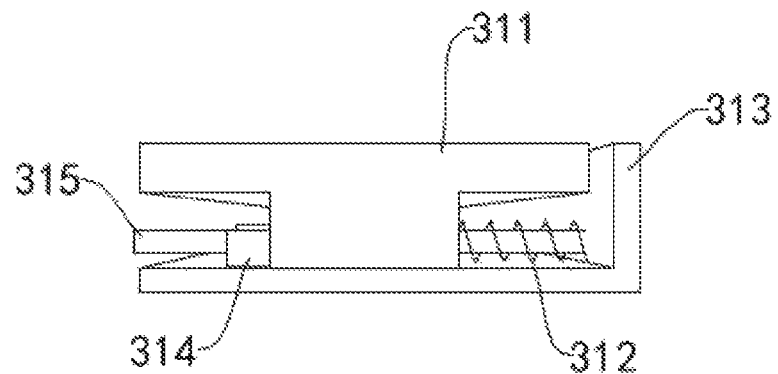
FIG. 5 is a second view of a partial structure of the first slider according to an embodiment of the present application.

The related features of the first slider provided in the embodiment of the present application will be described with reference to FIGS. 2 to 5, wherein FIG. 2 is a first view of a first slider provided in the embodiment of the present application, FIG. 3 is a first view of a partial structure of the first slider provided in the embodiment of the present application, FIG. 4 is a second view of the first slider provided in the embodiment of the present application, and FIG. 5 is a second view of a partial structure of the first slider provided in the embodiment of the present application.

The first slider 31 includes a first slide body 311 and a first elastic body 312, wherein the first elastic body 312 applies an elastic force to the first slide body 311 in a direction away from the rotating shaft 10, and the first slide body 311 is movable in the direction away from the rotating shaft 10 or in a direction close to the rotating shaft 10. The first slide body 311 is connected to the display panel 50 by the second adhesive member 42, so that the first slide body 311 drives the display panel 50 to move or has a tendency to stretch toward both ends of the display panel 50 under the elastic force exerted by the first elastic body 312.

A plane of the first slide body 311 supporting the display panel 50 is coplanar with a plane of the first body 21 supporting the display panel 50 to ensure the balance of the supporting force received by the display panel 50.

Alternatively, the first slide body 311 is moved in the direction away from the rotating shaft 10 by a distance ranging from 0.5 mm to 1 mm to ensure that the creases in the bend area 50a of the display panel 50 are relieved or eliminated under the action of the first slide body 311.

Alternatively, the first elastic body 312 includes a spring, and the spring is always in a compressed state, and generates an elastic force in the direction away from the rotating shaft 10.

Further, the first slider 31 further includes a first carrier 313, a first slide rail 314, and a first guide rod 315, and the first elastic body 312; the first slide body 311, the first slide rail 314, and the first guide rod 315 are disposed in the first carrier 313. The first elastic body 312 applies an elastic force to the first slide body 311 so that the first slide body 311 is movable within the first carrier 313 in the direction away from or close to the rotating shaft 10.

Alternatively, the first carrier 313 is movably connected to the first body 21, and the first carrier 313 is movable in the direction away from or close to the rotating shaft 10 to cushion a part of the force applied by the first slide body 311 to the display panel 50, and to adjust the magnitude of the elastic force applied by the first elastic body 312 to the first slide body 311, so as to ensure that the components in the bend area 50a of the display panel 50 are not plastically deformed under the force applied by the first slide body 311 to the display panel 50.

Further, the first slide body 311 is slidably connected to the first slide rail 314, and the first elastic body 312 applies an elastic force to the first slide body 311 along the first guide rod 315. The first slide rail 314 extends in a direction perpendicular to the length direction of the rotating shaft 10, to achieve the first slide body 311 to slide along the first slide rail 314 away from or close to the rotating shaft 10. The first guide rod 315 extends in a direction perpendicular to the length direction of the rotating shaft 10, and the first elastic body 312 applies an elastic force to the first slide body 311 in the direction away from the rotating shaft 10 along the first guide rod 315.

Alternatively, the number of the first slide rails 314 is two and disposed at opposite ends of the first carrier 313. The number of the first guide rods 315 is four, and distributed equidistantly in the first carrier 313 along the length direction of the first carrier 313.

Further, the first slide body 311 is provided with a first guide hole fitted with the first guide rod 315, the first guide rod 315 penetrates through the first guide hole, and the first elastic body 312 is sleeved on the first guide rod 315, thereby ensuring that the elastic force applied by the first elastic body 312 to the first slide body 311 extends along the first guide rod 315.

Further, the first carrier 313 has a groove structure, and a groove-shaped opening of the first carrier 313 faces the display panel. The first slide body 311 has a convex structure, and a convex end of the first slide body 311 faces a groove-shaped bottom of the first carrier 313. The first elastic body 312, the first slide rail 314, and the first guide rod 315 are disposed close to the groove-shaped bottom of the first carrier 313 so as to be covered by the first slide body 311 to form a good assembly appearance.

Specifically, the first slide body 311 includes a first carrier platform close to the display panel and a first support platform close to the groove-shaped bottom of the first carrier 313. A surface width of the first carrier platform on a side close to the display panel 50 is greater than a surface width of the first support platform on a side close to the groove-shaped bottom of the first carrier 313. The first elastic body 312 is disposed on a side of the first support platform facing the rotating shaft 10, and applies the elastic force away from the rotating shaft 10 to the first slide body 311.

Figure 6:
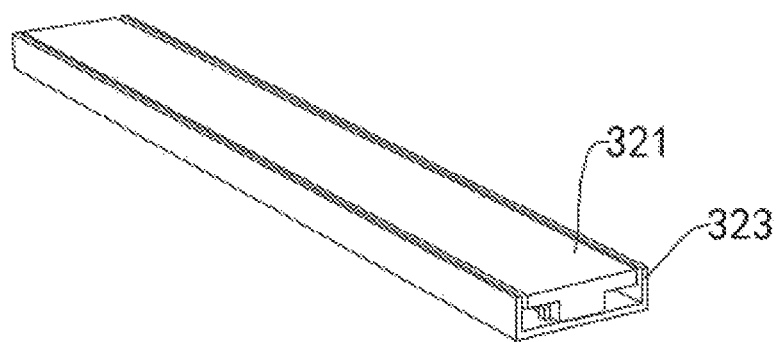
FIG. 6 is a first view of a second slider according to an embodiment of the present application.
Figure 7:
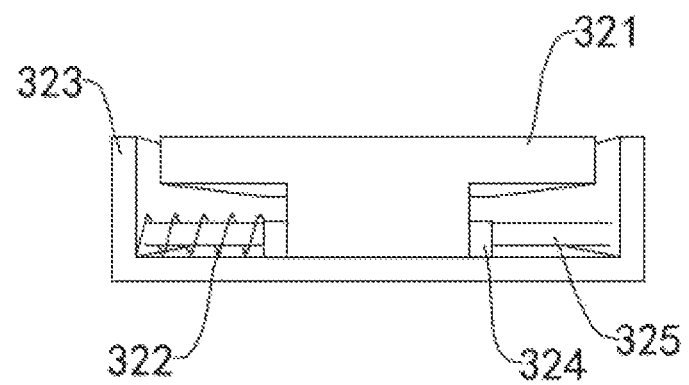
FIG. 7 is a second view of the second slider according to an embodiment of the present application.

The related features of the second slider provided in the present embodiment will be described below with reference to FIGS. 6 and 7, wherein FIG. 6 is a first view of the second slider provided in the present embodiment, and FIG. 7 is a second view of the second slider provided in the present embodiment.

The second slider 32 includes a second slide body 321 and a second elastic body 322, wherein the second elastic body 322 applies an elastic force to the second slide body 321 in the direction away from the rotating shaft 10, the second slide body 321 is movable in a direction away from the rotating shaft 10 or in a direction close to the rotating shaft 10. The second slide body 321 is connected to the display panel 50 by the second adhesive member 42, so that the second slide body 321 drives the display panel 50 to move or trend to move toward an end of the display panel 50 under the elastic force exerted by the second elastic body 322.

A plane of the second slide body 321 supporting the display panel 50 is coplanar with a plane of the second body 22 supporting the display panel 50 to ensure the balance of the supporting force received by the display panel 50.

Alternatively, the second slide body 321 is moved in the direction away from the rotating shaft 10 by a distance ranging from 0.5 mm to 1 mm to ensure that the creases in the bend area 50a of the display panel 50 are relieved or eliminated under the action of the second slide body 321.

Alternatively, the second elastic body 322 includes a spring, and the spring is always in a compressed state, and generates an elastic force in the direction away from the rotating shaft 10.

Further, the second slider 32 further includes a second carrier 323, a second slide rail 324, and a second guide rod 325, and the second elastic body 322, the second slide body 321, the second slide rail 324, and the second guide rod 325 are disposed in the second carrier 323. The second elastic body 322 applies an elastic force to the second slide body 321 so that the second slide body 321 is movable within the second carrier 323 in the direction away from or close to the rotating shaft 10.

Alternatively, the second carrier 323 is movably connected to the second body 22, and the second carrier 323 is movable in the direction away from or close to the rotating shaft 10 to cushion a part of the force applied by the second slide body 321 to the display panel 50, and to adjust the magnitude of the elastic force applied by the second elastic body 322 to the second slide body 321, so as to ensure that the components in the bend area 50a of the display panel 50 are not plastically deformed by the force applied by the second slide body 321 to the display panel 50.

Further, the second slide body 321 is slidably connected to the second slide rail 324, and the second elastic body 322 applies an elastic force to the second slide body 321 along the second guide rod 325. The second slide rail 324 extends in a direction perpendicular to the length direction of the rotating shaft 10, and the second slide body 321 slides along the second slide rail 324 away from or close to the rotating shaft 10. The second guide rod 325 extends in a direction perpendicular to the length direction of the rotating shaft 10, and the second elastic body 322 applies an elastic force to the second slide body 321 in the direction away from the rotating shaft 10 along the second guide rod 325.

Alternatively, the number of the second slide rails 324 is two and disposed at opposite ends of the second carrier 323. The number of the second guide rods 325 is four, and distributed equidistantly in the second carrier 323 along the length direction of the second carrier 323.

Further, the second slide body 321 is provided with a second guide hole fitted with the second guide rod 325, the second guide rod 325 penetrates through the second guide hole, and the second elastic body 322 sleeves the second guide rod 325, thereby ensuring that the elastic force applied by the second elastic body 322 to the second slide body 321 extends along the second guide rod 325.

Further, the second carrier 323 has a groove structure, and a groove-shaped opening of the second carrier 323 faces the display panel. The second slide body 321 has a convex structure, and a convex end of the second slide body 321 faces a groove-shaped bottom of the second carrier 323. The second elastic body 322, the second slide rail 324, and the second guide rod 325 are disposed close to the groove-shaped bottom of the second carrier 323 so as to be covered by the second slide body 321 to form a good assembly appearance.

Specifically, the second slide body 321 includes a second carrier platform close to the display panel and a second support platform close to the groove-shaped bottom of the second carrier 323. A surface width of the second carrier platform on a side close to the display panel 50 is greater than a surface width of the second support platform on a side close to the groove-shaped bottom of the second carrier 323. The second elastic body 322 is disposed on a side of the second support platform facing the rotating shaft 10, and applies the elastic force away from the rotating shaft 10 to the second slide body 321.

As described above, in the embodiment of the present application, the first slider 31 and the second slider 32 are provided, the first slider 31 and the second slider 32 are connected to the display panel 50 by the second adhesive member 42, the first body 21 and the second body 22 are connected to the display panel 50 by the first adhesive member 41, and the display panel 50 is stretched toward both ends by the elastic force provided by the first slider 31 and the second slider 32 in a direction away from the rotating shaft 10, thereby relieving the creases in the bend area of the display panel 50, and improving the appearance characteristics and the display characteristics of the display device.

It should be noted that, although the present application discloses the foregoing embodiments, the foregoing embodiments are not intended to limit the present application. A person of ordinary skill in the art may make various changes and finishes without departing from the spirit and scope of the present application. Therefore, the scope of protection of the present application is subject to the scope defined by the claims.

What is claimed is:

1. A display device, comprising:
    a rotating shaft;
    a first body and a second body disposed on opposite sides of the rotating shaft and rotatably connected to the rotating shaft;
    a first slider and a second slider, wherein the first slider is connected to the first body; the second slider is connected to the second body; the first slider comprises a first slide body, and a first elastic body for applying an elastic force to the first slide body in a direction away from the rotating shaft; the second slider comprises a second slide body, and a second elastic body for applying an elastic force to the second slide body in the direction away from the rotating shaft; and
    a display panel disposed on a bearing surface defined by the first body, the second body, the first slide body, and the second slide body; wherein the display panel is connected to the first body and the second body by a first adhesive member, and the display panel is connected to the first slide body and the second slide body by a second adhesive member;
    an elastic modulus of the second adhesive member is greater than an elastic modulus of the first adhesive member;
    wherein the first slider comprises a first carrier; the first elastic body and the first slide body are disposed in the first carrier; and the first slide body is movable in the first carrier in a direction away from or close to the rotating shaft; wherein the second slider comprises a second carrier; the second elastic body and the second slide body are disposed in the second carrier; and the second slide body is movable in the second carrier in a direction away from or close to the rotating shaft;
    wherein the first carrier is movably connected to the first body, and the first carrier is movable in the direction away from or close to the rotating shaft.

2. The display device according to claim 1, wherein an elastic force applied by the first elastic body to the first slide body is greater than a shear resistance force of the first adhesive member and less than a shear resistance force of the second adhesive member, and an elastic force applied by the second elastic body to the second slide body is greater than the shear resistance force of the first adhesive member and less than the shear resistance force of the second adhesive member.

3. The display device according to claim 1, wherein a plane of the first slide body supporting the display panel is coplanar with a plane of the first body supporting the display panel, and a plane of the second slide body supporting the display panel is coplanar with a plane of the second body supporting the display panel.

4. The display device according to claim 1, wherein the second carrier is movably connected to the second body, and the second carrier is movable in the direction away from or close to the rotating shaft.

5. The display device according to claim 1, wherein the first slider further comprises a first slide rail and a first guide rod fixedly disposed in the first carrier; the first slide body is slidably connected to the first slide rail; and the first elastic body applies an elastic force to the first slide body along the first guide rod.

6. The display device according to claim 5, wherein the second slider further comprises a second slide rail and a second guide rod fixedly disposed in the second carrier; the second slide body is slidably connected to the second slide rail; and the second elastic body applies an elastic force to the second slide body along the second guide rod.

7. The display device according to claim 6, wherein a first guide hole fitted with the first guide rod is defined on the first slide body; the first guide rod is perforated through the first guide hole; and the first elastic body is sleeved on the first guide rod.

8. The display device according to claim 7, wherein a second guide hole fitted the second guide rod is defined on the second slide body; the second guide rod is perforated through the second guide hole; and the second elastic body is sleeved on the second guide rod.

9. The display device according to claim 8, wherein the first carrier has a groove structure, and a groove-shaped opening of the first carrier faces the display panel; the first slide body has a convex structure, and a convex end of the first slide body faces a groove-shaped bottom of the first carrier.

10. The display device according to claim 9, wherein the second carrier has a groove structure, and a groove-shaped opening of the second carrier faces the display panel; the second slide body has a convex structure, and a convex end of the second slide body faces a groove-shaped bottom of the second carrier.

11. The display device according to claim 10, wherein the first slide body comprises a first carrier platform close to the display panel and a first support platform close to the groove-shaped bottom of the first carrier;
a surface width of the first carrier platform on a side close to the display panel is greater than a surface width of the first support platform on a side close to the groove-shaped bottom of the first carrier.

12. The display device according to claim 11, wherein the first elastic body is disposed on a side of the first support platform facing the rotating shaft.

13. The display device according to claim 12, wherein the second slide body comprises a second carrier platform close to the display panel and a second support platform close to the groove-shaped bottom of the second carrier;
a surface width of the second carrier platform on a side close to the display panel is greater than a surface width of the second support platform on a side close to the groove-shaped bottom of the second carrier.

14. The display device according to claim 13, wherein the second elastic body is disposed on a side of the second support platform facing the rotating shaft.

15. The display device according to claim 6, wherein a number of the first slide rails is two, and the first slide rails are disposed at opposite ends of the first carrier; a number of the first guide rods is four, and the first guide rods are distributed equidistantly in the first carrier along a length direction of the first carrier;
a number of the second slide rails is two, and the second slide rails are disposed at opposite ends of the second carrier; a number of the second guide rods is four, and the second guide rods are distributed equidistantly in the second carrier along a length direction of the second carrier.

16. The display device according to claim 1, wherein the first adhesive member is disposed along edges of the first body and the second body, and an extension direction of the first adhesive member is perpendicular to a length direction of the rotating shaft; the second adhesive member is disposed along the first slide body and the second slide body, and an extension direction of the second adhesive member is parallel to the length direction of the rotating shaft.

17. A display device, comprising:
a rotating shaft;
a first body and a second body disposed on opposite sides of the rotating shaft and rotatably connected to the rotating shaft;
a first slider and a second slider, wherein the first slider is connected to the first body; the second slider is connected to the second body; the first slider comprises a first slide body, and a first elastic body for applying an elastic force to the first slide body in a direction away from the rotating shaft; the second slider comprises a second slide body, and a second elastic body for applying an elastic force to the second slide body in the direction away from the rotating shaft; and
a display panel disposed on a bearing surface defined by the first body, the second body, the first slide body, and the second slide body; wherein the display panel is connected to the first body and the second body by a first adhesive member, and the display panel is connected to the first slide body and the second slide body by a second adhesive member;
an elastic modulus of the second adhesive member is greater than an elastic modulus of the first adhesive member, an elastic force applied by the first elastic body to the first slide body is greater than a shear resistance force of the first adhesive member and less than a shear resistance force of the second adhesive member, and an elastic force applied by the second elastic body to the second slide body is greater than the shear resistance force of the first adhesive member and less than the shear resistance force of the second adhesive member;
the first adhesive member is disposed along edges of the first body and the second body, and an extension direction of the first adhesive member is perpendicular to a length direction of the rotating shaft; the second adhesive member is disposed along the first slide body and the second slide body, and an extension direction of the second adhesive member is parallel to the length direction of the rotating shaft;
wherein the first slider comprises a first carrier; the first elastic body and the first slide body are disposed in the first carrier; and the first slide body is movable in the first carrier in a direction away from or close to the rotating shaft; wherein the second slider comprises a second carrier; the second elastic body and the second slide body are disposed in the second carrier; and the second slide body is movable in the second carrier in a direction away from or close to the rotating shaft;
wherein the first carrier is movably connected to the first body, and the first carrier is movable in the direction away from or close to the rotating shaft.

18. A display device, comprising:
a rotating shaft;
a first body and a second body disposed on opposite sides of the rotating shaft and rotatably connected to the rotating shaft;
a first slider and a second slider, wherein the first slider is connected to the first body; the second slider is connected to the second body; the first slider comprises a first slide body, and a first elastic body for applying an elastic force to the first slide body in a direction away from the rotating shaft; the second slider comprises a second slide body, and a second elastic body for applying an elastic force to the second slide body in the direction away from the rotating shaft; and a display panel disposed on a bearing surface defined by the first body, the second body, the first slide body, and the second slide body; wherein the display panel is connected to the first body and the second body by a first adhesive member, and the display panel is connected to the first slide body and the second slide body by a second adhesive member;

an elastic modulus of the second adhesive member is greater than an elastic modulus of the first adhesive member;

wherein the first slider comprises a first carrier; the first elastic body and the first slide body are disposed in the first carrier; and the first slide body is movable in the first carrier in a direction away from or close to the rotating shaft; wherein the second slider comprises a second carrier; the second elastic body and the second slide body are disposed in the second carrier; and the second slide body is movable in the second carrier in a direction away from or close to the rotating shaft;

wherein the first slider further comprises a first slide rail and a first guide rod fixedly disposed in the first carrier; the first slide body is slidably connected to the first slide rail; and the first elastic body applies an elastic force to the first slide body along the first guide rod.

19. The display device according to claim 18, wherein the second slider further comprises a second slide rail and a second guide rod fixedly disposed in the second carrier; the second slide body is slidably connected to the second slide rail; and the second elastic body applies an elastic force to the second slide body along the second guide rod.

20. The display device according to claim 19, wherein a first guide hole fitted with the first guide rod is defined on the first slide body; the first guide rod is perforated through the first guide hole; and the first elastic body is sleeved on the first guide rod.

* * * * *